US009965341B2

(12) United States Patent
Ye et al.

(10) Patent No.: US 9,965,341 B2
(45) Date of Patent: May 8, 2018

(54) METHOD AND DEVICE FOR EXCHANGING DATA BETWEEN PROCESSES (71) Applicant: Tencent Technology (Shenzhen) Company Limited, Shenzhen (CN)

(72) Inventors: Liwei Ye, Shenzhen (CN); Cheng Luo, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 39 days.

(21) Appl. No.: 15/149,259

(22) Filed: May 9, 2016

(65) Prior Publication Data

US 2016/0253225 A1    Sep. 1, 2016

Related U.S. Application Data (63) Continuation of application No. PCT/CN2014/090214, filed on Nov. 4, 2014.

(30) Foreign Application Priority Data

Nov. 7, 2013    (CN) .......................... 2013 1 0549591

(51) Int. Cl.
*G06F 9/44*    (2018.01)
*G06F 9/54*    (2006.01)
(Continued)

(52) U.S. Cl.
CPC .............. *G06F 9/544* (2013.01); *H04L 67/06* (2013.01); *H04L 67/42* (2013.01)

(58) Field of Classification Search
CPC ....................................................... G06F 9/544
See application file for complete search history.

(56) References Cited

U.S. PATENT DOCUMENTS 5,590,334 A  * 12/1996  Saulpaugh .............. G06F 9/465
                                                                709/206
6,061,713 A     5/2000  Bharadhwaj
                  (Continued)

FOREIGN PATENT DOCUMENTS

CN       101087314 A      12/2007
CN       102103526 A       6/2011
CN       102591726 A       7/2012

OTHER PUBLICATIONS

International Search Report in International Application No. PCT/CN2014/090214 dated Jan. 30, 2015, 2 pages.

(Continued)

*Primary Examiner* — Andy Ho
*Assistant Examiner* — Abdou Seye
(74) *Attorney, Agent, or Firm* — Marshall, Gerstein & Borun LLP (57) ABSTRACT A method for exchanging data between processes includes: establishing a connection with a server process via a server interface obtained by encapsulating a port; receiving a data process request carrying a name of the server process from a client process via a client interface obtained by encapsulating the port; sending the data process request to the server process via the server interface; establish a connection between the client process and the server process according to the name of the server process; forwarding data sent from the client process to the server process via the server interface; and forwarding data processed by the server process to the client process via the client interface.

10 Claims, 5 Drawing Sheets (51) Int. Cl.
H04L 29/08 (2006.01)
H04L 29/06 (2006.01)

(56) References Cited

U.S. PATENT DOCUMENTS

| | | | |
|---|---|---|---|
| 6,157,959 | A | 12/2000 | Bonham et al. |
| 7,406,496 | B2* | 7/2008 | St. Pierre ................ H04L 29/06 709/203 |
| 8,032,900 | B2 | 10/2011 | Leonov et al. |
| 2004/0044909 | A1* | 3/2004 | Mirza ................ H04L 63/0281 726/27 |
| 2008/0127206 | A1* | 5/2008 | Leonov ................ G06F 9/4843 719/313 |
| 2013/0332941 | A1* | 12/2013 | Ramesh ................ G06F 9/4831 719/314 |

OTHER PUBLICATIONS

International Preliminary Report on Patentability and Written Opinion in International Application No. PCT/CN2014/090214 dated May 10, 2016, 5 pages.
Office Action in CN Application No. 201310549591.3 dated Dec. 29, 2017, 7 pages.

* cited by examiner

METHOD AND DEVICE FOR EXCHANGING DATA BETWEEN PROCESSES

This application is a continuation of International Application No. PCT/CN2014/090214, filed on Nov. 4, 2014. This application claims the benefit and priority of Chinese Application No. 201310549591.3, filed on Nov. 7, 2013. The entire disclosures of each of the above applications are incorporated herein by reference.

FIELD OF THE INVENTION

The present disclosure relates a communication technology field, and more particularly, to a method and device for exchanging data between processes.

BACKGROUND

In an Operating System (iOS) system, in order to ensure that a program may run steadily and smoothly, some limitations are made on the program. For instance, a non-system level program is not allowed to run in the background. Therefore, if the program is switched to run in the background, the program may be hung up by the system in a short time and the program may stop running. Programs cannot access each other's resources. Therefore, data exchange between programs (or processes) cannot be performed.

SUMMARY

Embodiments of the present disclosure provide a method and device for exchanging data between processes to enhance efficiency for exchanging data between processes.

An embodiment of the present disclosure provides a method for exchanging data between processes, including:
 establishing a connection with a server process via a server interface obtained by encapsulating a port;
 receiving a data process request carrying a name of the server process from a client process via a client interface obtained by encapsulating the port;
 sending the data process request to the server process via the server interface;
 establish a connection between the client process and the server process according to the name of the server process;
 forwarding data sent from the client process to the server process via the server interface; and
 forwarding data processed by the server process to the client process via the client interface.

Another embodiment of the present disclosure provides a device for exchanging data between processes, including:
 a server interface, a client interface, a first establishment unit, a reception unit, a transmission unit, a second establishment unit; wherein the server interface and client interface are obtained by encapsulating the device;
 the first establishment unit is to establish a connection with a server process via the server interface;
 the reception unit is to receive a data process request carrying a name of the server process from a client process via the client interface;
 the transmission unit is to send the data process request to the server process via the server interface, send data sent from the client process to the server process via the server interface and forward data processed by the server process to the client process via the client interface; and
 the second establishment unit is to establish a connection between the client process and the server process according to a name of the server process.

In the method and device for exchanging data between processed provided by embodiments of the present disclosure, the connection may be established between the server interface obtained by encapsulating the port and the server process. The data process request carrying the name of the server process may be received via the client interface obtained by encapsulating the port. The data process request may be sent to the server process via the server interface. The connection may be established between the client process and the server process according to the name of the server process. The data sent from the client process may be sent to the server process via the server interface. The data processed by the server process may be forwarded to the client process. The exchange between the client process and the server process may be completed and the data exchange speed and data exchange efficiency may be enhanced.

DETAILED DESCRIPTION

The present invention is further described in detail hereinafter with reference to the accompanying drawings to make the objective, technical solution and merits thereof more apparent.

According to an example, data exchange is implemented via a socket mode. The socket is used for describing an IP address and port and is a handle of a communication link. As its English meaning "socket", the socket is like a porous socket. A host may run multiple service software and provide several kinds of services. Each service opens a socket and is bound to a port. Different ports correspond to different services. When two processes exchange data, one process serves as a server, the other process serves as a client and performs the data exchange after connecting to a port designated by the server.

Since ports provided by the server need to be obtained in advance and the ports may be occupied by other servers in other processes, the server should adopt a dynamic port. Therefore, this scheme should inform the client process of the ports via other modes. If the socket connection disconnects or the transmission of the data times out due to unstable connection between the server process and the client process, the connection between the server process and the client process needs to be re-established or the data needs to be re-transmitted. Therefore, an operation for establishing the process and maintaining the socket connection is complicated. Furthermore, since the connection between the server and the client needs to be established in advance, this scheme applies to a "star" program architecture mode that there is a one-to-one connection relationship between the server and the client. The application scope of the scheme is narrow. Furthermore, when multiple processes exchange data with each other via interactive-connected "net" connection mode, requirements can be met by establishing a sever interface and a client interface in each process. Therefore, it is more difficult and complicated to maintain the data exchange between the server process and the client process. If the socket mode is used to satisfy an application, which is not frequently used and has low real-time requirement, system resources are wasted.

A method for exchanging data between processes provided by various embodiments of the present disclosure may enhance efficiency for exchanging data between processes.

Figure 1:
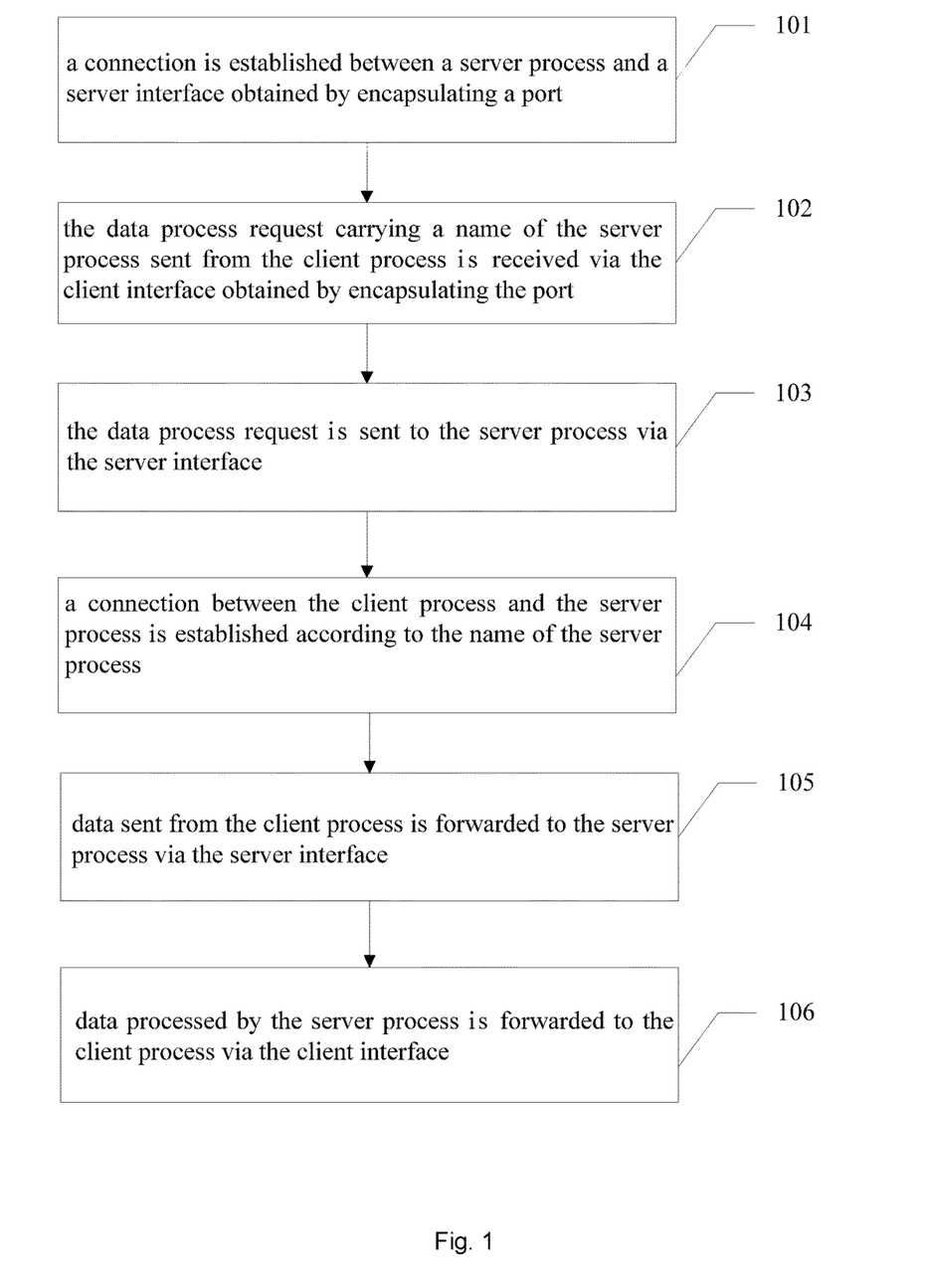
FIG. 1 is a flow chart illustrating a method for exchanging data between processes in accordance with various embodiments of the present disclosure.

Referring to FIG. 1, an embodiment for exchanging data between processes is described hereinafter.

At block 101, a connection may be established between a server process and a server interface obtained by encapsulating a port.

In this embodiment, the port may be a Core Foundation (CF)MessagePort, a socket or a pipe in an iPhone Operating System (iOS). If the system is an android system, the port may be the socket, a pipe or binder.

Figure 2:
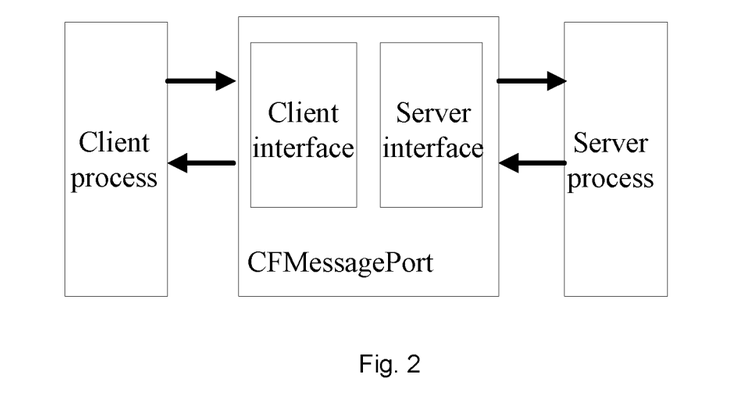
FIG. 2 is a diagram illustrating data exchange between processes via an interface of a CFMessagePort in accordance with various embodiments of the present disclosure.

If a system is the iOS, the port may be a CFMessagePort, the socket or the pipe. A network engine module in the system may encapsulate the CFMessagePort, so that the CFMessagePort may provide the server interface and client interface for processes. Referring to FIG. 2, after a server starts, the connection may be established between the server interface and the server process. When the client process sends a data process request, the client interface may be called to send the data process request. Therefore, the data exchange between the processes may be more convenient by using the CFMessagePort.

It should be noted that in each embodiment including this embodiment, in the process of data exchange, a process of a server side may be called the server process and the process of the client side may be called the client process.

The server process may run and establish the connection with the server interface via the CFMessagePort.

At block 102, the data process request carrying a name of the server process sent from the client process may be received via the client interface obtained by encapsulating the port.

At block 103, the data process request may be sent to the server process via the server interface.

In an example, the client process may call the client interface of the CFMessagePort and send the data process request to the server process to request the server process to process the data sent from the client process. The data process request may carry a name of the server process. The name of the server process may be pre-set for the server process and client process. In this example, if the client process knows the name of the server process, to which the data process request is sent, the client process may call the client interface of the CFMessagePort to send the data process request to the server process.

At block 104, a connection between the client process and the server process may be established according to the name of the server process.

At block 105, data sent from the client process may be forwarded to the server process via the server interface.

At block 106, data processed by the server process may be forwarded to the client process via the client interface.

The client interface of the CFMessagePort may establish the connection between the client process and the server process corresponding to the name of the server process according to the name of the server process, forward the data to the server process for processing and forward the data processed by the server process to the client process.

In this embodiment of the present disclosure, the CFMessagePort may be encapsulated to provide the server interface and client interface for the processes. The client process may call the client interface to send the data process request to the server process. The CFMessagePort may establish the connection between the client process and the server process according to the name of the server process in the data process request, forward the data sent from the client process to the server process for processing and forward the data processed by the server process to the client process. Till then, the data exchange between the client process and the server process may be completed and data exchange efficiency may be enhanced.

Furthermore, the connection may be simply and quickly established between the server process and the client process according to the name of the server process with the above scheme. This scheme not only applies to a "star" program architecture that there is a one-to-one connection relationship between processes, but also applies to a "net" program architecture, in which multiple processes interactively connected with each other. As for the data exchange in the "net" program architecture, the server interface and client interface need not to be established in each process. Therefore, the maintenance is more simple and convenient and system resources may be effectively utilized.

Figure 3:
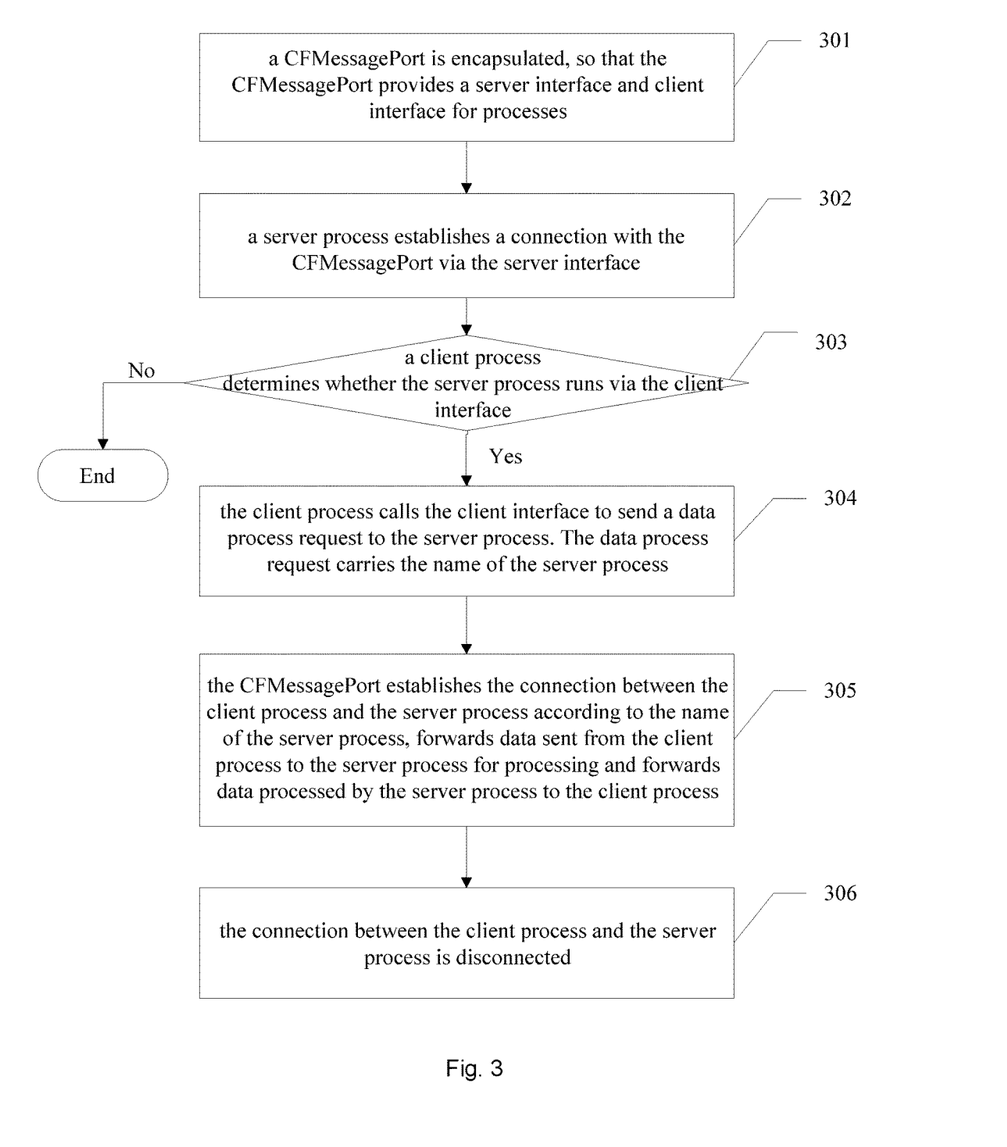
FIG. 3 is a flow chart illustrating another method for exchanging data between processes in accordance with various embodiments of the present disclosure.

Referring to FIG. 3, FIG. 3 is another example for exchanging data between processes in accordance with various embodiments of the present disclosure.

At block 301, a CFMessagePort may be encapsulated, so that the CFMessagePort may provide a server interface and client interface for processes.

At block 302, a server process may establish a connection with the CFMessagePort via the server interface.

Detailed content of the blocks 301 and 302 may be described in the block 101 and block 102 shown in FIG. 1, which may not be repeated here.

At block 303, a client process may determine whether the server process runs via the client interface.

The client interface generated by encapsulating the CFMessagePort may provide a function for determining whether the server process is valid to the client process. Before the client process requests the server process to process the data, the client process may call the client interface of the CFMessagePort to determine whether the client process exists and runs to avoid failure of data transmission.

If the server process runs, block 304 may be executed. If the server process does not exist or is invalid, the client process cannot request the server process to process the data. Then, the flow of this embodiment may end.

At block 304, the client process may call the client interface to send a data process request to the server process. The data process request may carry a name of the server process.

In this embodiment, the client interface generated by encapsulating the CFMessagePort may have a function for providing synchronous data request processing and asynchronous data request processing for the client process. The client process may send a synchronous data process request or an asynchronous data process request. That is, the client process may send the synchronous data process request or the asynchronous data process request via the client interface. If the client process sends the data process request and the server process should make corresponding processing and make a response, the client process may register a callback interface via the client interface of the CFmessagePort when the client process sends the data. When the client process receives the data processed by the server process, the client process may send the received data to an application layer for processing via the registered callback interface. When the client process sends the data, the callback interface may be registered to a network engine module of the CFmessagePort. After the client process receives the data processed by the server process, the client process may scan a registered queue according to message name sent from the server process, find the callback interface and send the received data to the application layer via the callback interface.

Furthermore, the client interface generated by encapsulating the CFMessagePort may provide an error callback function of data reception and transmission failure or data reception and transmission timeout for the client process. If the client process fails to send the data process request to the server process, the client process may call an interface to send a notification to an application layer to inform the application layer to determine whether the data process request needs to be re-transmitted. The interface may have the error callback function of the data reception and transmission failure or data reception and transmission timeout.

At block 305, the CFMessagePort may establish the connection between the client process and the server process according to the name of the server process, forward data sent from the client process to the server process for processing and forward data processed by the server process to the client process.

The client interface generated by encapsulating the CFMessagePort may provide have the function for establishing the connection between the client process and the server process. If the client process obtains the name of the server process, which may be a character string, the CFMessagePort may establish the connection between the client process and the server process according to the name of the server process.

Furthermore, the server interface generated by encapsulating the CFMessagePort may provide a register callback function for the server process. That is, the server process may monitor a register message sent from the client process via the server interface of the CFMessagePort. If the monitored register message has been registered, a callback interface, which is registered by the client process registering the register message, may be called to process the data and the processed data may be sent to the client process via the server interface. The server process may monitor the message sent from the client process via the server interface of the CFMessagePort. When the register message is monitored, the server process may scan its queue of registered messages. If the register message has been registered, the data processing may be completed by calling the callback interface corresponding to the process registering the register message and the processed data may be returned to the client process via the server interface.

At block 306, the connection between the client process and the server process may be disconnected.

The server interface generated by encapsulating the CFMessagePort may provide a function for disconnecting the connection between the client process and the server process for the server process. After the client process receives the data processed by the server process, the server process may disconnect the connection between the client process and the server process and re-establish the connection between the client process and the server process when the server process receives the next data process request. Therefore, it may be avoided that too many resources may be occupied due to long time connection.

Furthermore, the CFMessagePort may provide a complete error notification information function for the server process and the client process. Therefore, various fault-tolerant operations may be provided for the server process and the client process via the error notification information function in the case of abnormal running of the server process, timeout of the data reception and timeout of data transmission and data transmission error.

Furthermore, the CFMessagePort may provide a data transmission encryption and decryption function for the server process and client process, so that the server process and the client process may encrypt and decrypt the transmitted data when the data is exchanged to enhance the security of the data transmission.

In this embodiment of the present disclosure, before the client process requests the server process to process the data, the client process may call the client interface of the CFMessagePort to determine whether there is the server process and whether the server process runs normally to enhance success rate of the data transmission. After the client process receives the data processed by the server process, the server process may disconnect the connection with the client process and re-establish the connection when a process re-transmits the data process request to avoid occupying too many resources due to long time connection. The client interface generated by encapsulating the CFMessagePort may provide the function of sending the synchronous data process request or the asynchronous data process request for the client process, so that the mode for sending the data process request by the client process is more flexible.

Figure 4:
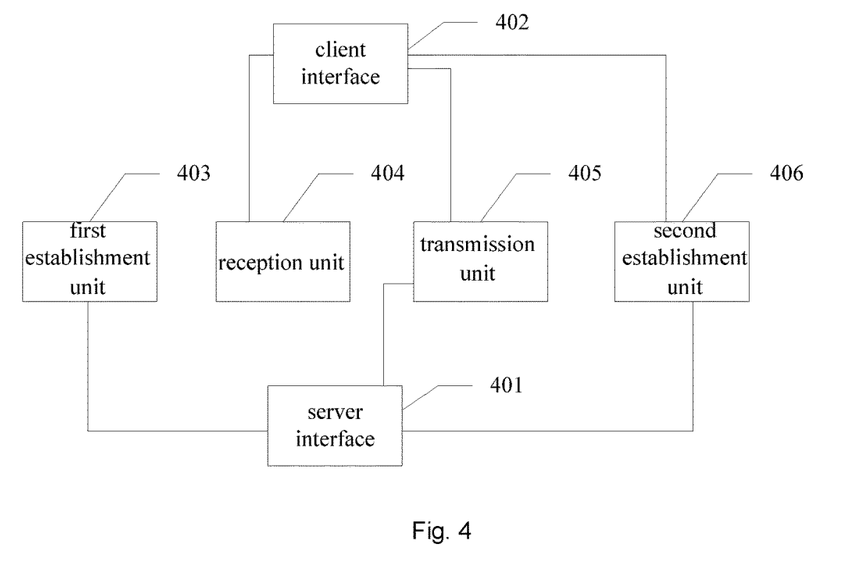
FIG. 4 is a diagram illustrating structure of a device for exchanging data between processes in accordance with various embodiments of the present disclosure.

A device for exchanging data between processes may be described in the hereinafter embodiment. Referring to FIG. 4, the device for exchanging data between processes in this embodiment of the present disclosure may include: a server interface 401, a client interface 402, a first establishment unit 403, a reception unit 404, a transmission unit 405 and a second establishment unit 406. The server interface 401 and client interface 402 may be obtained by encapsulating the device.

The first establishment unit 403 may be configured to establish a connection with a server process via the server interface 401.

The reception unit 404 may be configured to receive a data process request carrying a name of the server process from a client process via the client interface 402.

The transmission unit 405 may be configured to send the data process request to the server process via the server interface 401, send data sent from the client process to the server process via the server interface 401 and forward data processed by the server process to the client process via the client interface 402.

The second establishment unit 406 may be configured to establish a connection between the client process and the server process according to a name of the server process.

The specific process of implementing a function each unit in the device for exchanging the data between the processes in this embodiment of the present disclosure may be similar to that in the embodiment shown in FIG. 1, which may not be repeated here.

With the operation of the above each unit, the data exchange between the client process and the server process may be implemented and data exchange efficiency may be enhanced. Furthermore, the connection may be simply and quickly established between the server process and the client process according to the name of the server process with the above scheme. This scheme not only applies to a "star" program architecture that there is a one-to-one connection relationship between processes, but also applies to a "net" program architecture, in which multiple processes may be interactively connected with each other. As for the data exchange in the "net" program architecture, the server interface and client interface need not to be established in each process. Therefore, the maintenance is more simple and convenient and system resources may be effectively utilized.

Figure 5:
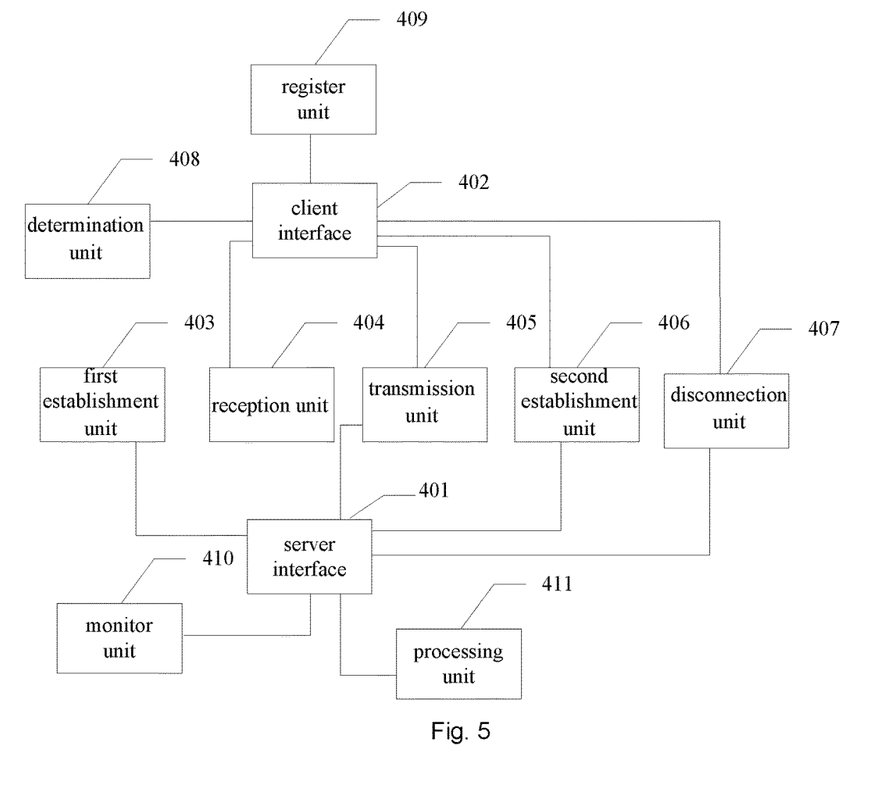
FIG. 5 is a diagram illustrating structure of another device for exchanging data between processes in accordance with various embodiments of the present disclosure.

Referring to FIG. 5, FIG. 5 is a diagram illustrating another device for exchanging data between processes in accordance with various embodiments of the present disclosure. Different from the embodiment shown in FIG. 4, the device for exchanging data between the processes in this embodiment may further include following units.

A disconnection unit 407 may be configured to disconnect the connection between the client process and the server process.

Furthermore, the device for exchanging the data between the processes in this embodiment of the present disclosure may further include:

a determination unit 408, configured to determine whether the server process has run via the client interface by the client process.

The transmission unit 405 may be further configured to call the client interface to send the data process request if the server process has run.

The transmission unit 405 may be further configured to send a synchronous data process request or an asynchronous data process request via the client interface by the client process.

The transmission unit 405 may be further configured to call an interface to send a notification to a corresponding application layer by the client process to inform the application layer whether the data process request needs to be re-transmitted if the client process fails to send the data process request to the server process.

Furthermore, the device for exchanging data between the processes may further include:

a register unit 409, configured to register a callback interface via the client interface by the client process when the data is transmitted.

Furthermore, the transmission unit 405 may be configured to send the received data to the application layer for processing according to the callback interface when the data processed by the server process is received.

Furthermore, the device for exchanging the data between the processes in this embodiment of the present disclosure may further include:

a monitor unit 410, configured to monitor a register message sent from the client process via the server interface by the server process; and a processing unit 411, configured to perform data process by calling the callback interface, which may be registered by the client process registering the register message if the register message has been registered.

Furthermore, the transmission unit 405 may be further configured to send the processed data to the client process via the server interface.

The specific process of implementing a function each unit in the device for exchanging the data between the processes in this embodiment of the present disclosure may be similar to that in the embodiment shown in FIG. 1 and FIG. 3, which may not be repeated here.

In this embodiment of the present disclosure, the determination unit 408 may be configured to determine whether the server process has run to enhance the success rate of the data transmission. After the client process receives the date processed by the server process, the disconnection unit 407 may disconnect the connection between the client process and the server process and re-establish the connection when the process re-transmits the data process request, to avoid occupying too many transmission resources due to long time connection. The transmission unit 405 may transmit the synchronous data process request or the asynchronous data process request. The client interface generated by encapsulating the CFMessagePort may provide the function of sending the synchronous data process request and the asynchronous data process request for the client process, sot that the mode for the client process to send the data process request is more flexible.

Figure 6:
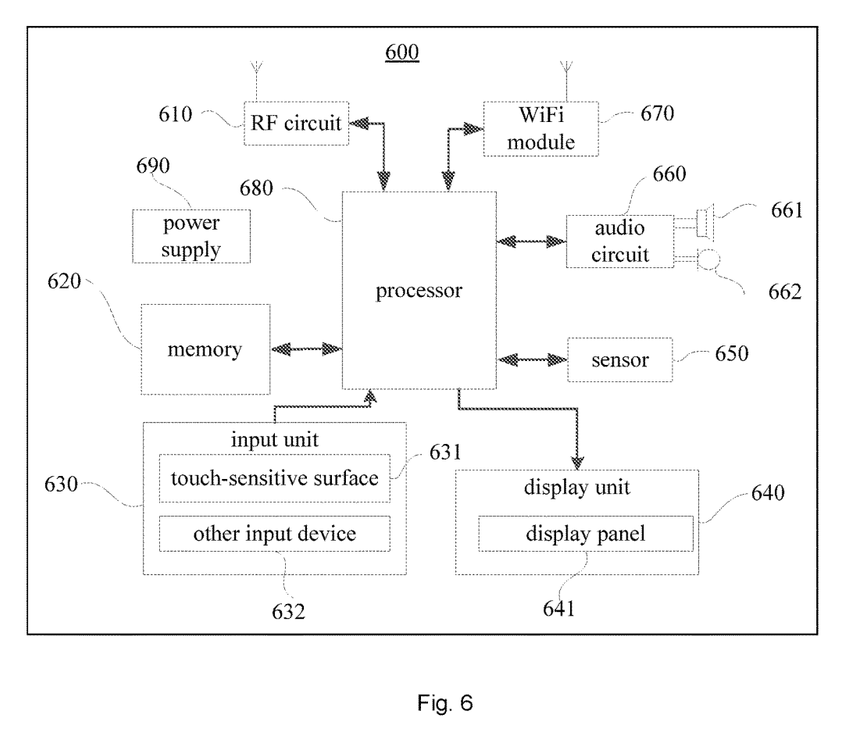
FIG. 6 is a diagram illustrating structure of another device for exchanging data between processes in accordance with various embodiments of the present disclosure.

Referring to FIG. 6, FIG. 6 is a diagram illustrating another device for exchanging data between processes in accordance with various embodiments of the present disclosure.

The exemplary device 600 can include an RF (Radio Frequency) circuit 610, a memory 620 including one or more machine-readable storage media, an input unit 630, a display unit 640, a sensor 650, an audio circuit 660, a Wireless Fidelity (WiFi) module 670, a processor 680 including one or more processing cores, a power supply 690, and/or other components. It is well known to an ordinary skilled in the art of the present disclosure that the structure of the terminal device shown in FIG. 6 cannot limit the terminal device in embodiments of the present disclosure. The terminal devices in the embodiments of the present disclosure may include more or less components than those in FIG. 6. In another example, the terminal device in embodiments of the present disclosure may consist of combination of some components or different component layouts.

The RF circuit 610 may be used to send and receive information or send and receive a signal during communication. In particular, after receiving downlink information from a base station, such information can be processed by the one or more processors 680. Furthermore, the data related to the uplink can be sent to the base station. Generally, the RF circuit 610 can include, but be not limited to, an antenna, at least one amplifier, a tuner, one or more oscillators, user identity module (SIM) card, a transceiver, a coupler, LNA (i.e., Low Noise Amplifier), duplexer, etc. In addition, the RF circuit 610 may communicate with other devices via a wireless communication network. The wireless communication may use any communication standards or protocols, including but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 620 can be used for storing software programs and modules. By running software programs and modules stored in the memory 620, the processor 680 can perform various functional applications and data processing. The memory 620 can include a program storage area and a data storage area. The program storage area can store the operating system, applications (such as sound playback, image playback, etc.) required by at least one function. The data storage area can store data (such as audio data, phone book, etc.) created when using the terminal device 600. In addition, the memory 620 may include a high-speed random access memory, a non-volatile memory, such as at least one disk memory, flash memory, and/or other volatile solid-state memory elements. Accordingly, the memory 620 may further include a memory controller to provide the processor 680 and the input unit 630 with access to the memory 620.

The input unit 630 can be used to receive inputted numeric or character information, and to generate signal input of keyboard, mouse, joystick, and trackball or optical signal input related to the user settings and function controls. Specifically, the input unit 630 may include a touch sensitive surface 631 and other input device(s) 632. The touch-sensitive surface 631, also known as a touch screen or touch panel, may collect touch operations that a user conducts on or near the touch-sensitive surface 631. For example, a user may use a finger, a stylus, and any other suitable object or attachment on the touch-sensitive surface 631 or on an area near the touch-sensitive surface 631. The touch-sensitive surface 631 may drive a connecting device based on a preset program. The touch sensitive surface 631 may include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 680, and receive commands sent from the processor 680 to execute. Furthermore, the touch sensitive surface 631 can be realized by resistive, capacitive, infrared surface acoustic wave, and/or other types of surface touch. In addition to the touch sensitive surface 631, the input unit 630 may also include other input device(s) 632. Specifically, the other input device(s) 632 may include, but be not limited to, a physical keyboard, function keys (such as volume control buttons, switch buttons, etc.), a trackball, a mouse, an operating lever, or combinations thereof.

The display unit 640 can be used to display information inputted by the user, information provided to the user, and a variety of graphical user interfaces of the terminal device 600. These graphical user interfaces can be formed by images, text, icons, videos, and/or any combinations thereof. The display unit 640 may include a display panel 641 configured by, e.g., LCD (Liquid Crystal Display), OLED (Organic Light-Emitting Diode), etc. Further, the touch sensitive surface 631 may cover the display panel 641. When the touch sensitive surface 631 detects a touch operation on or near the touch sensitive surface, the touch operation can be sent to the processor 680 to determine a type of the touch operation. Accordingly, the processor 680 can provide visual output on the display panel 641. Although in FIG. 6 the touch-sensitive surface 631 and the display panel 641 are shown as two separate components to achieve input and output functions, in some embodiments, the touch sensitive surface 631 and the display panel 641 can be integrated to perform input and output functions.

The terminal device 600 may further include at least one sensor 650, such as optical sensors, motion sensors, and other suitable sensors. Specifically, the optical sensors may include an ambient optical sensor and a proximity sensor. The ambient optical sensor may adjust brightness of the display panel 641 according to the brightness of ambient light. The proximity sensor can turn off the display panel 641 and/or turn backlighting, when the terminal device 600 moves to an ear. As a type of motion sensor, a gravity sensor may detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), vibration recognition related functions (e.g., pedometer, percussion, etc.), etc. The terminal device 600 can also be configured with, e.g., a gyroscope, a barometer, a hygrometer, a thermometer, an infrared sensor, and/or other sensors.

The audio circuit 660, the speaker 661, and the microphone 662 may provide an audio interface between the user and terminal device 600. The audio circuit 660 may transmit an electrical signal converted from the received audio data to the speaker 661 to convert into audio signal output. On the other hand, the microphone 662 can convert the collected sound signal to an electrical signal, which can be received by the audio circuit 660 to convert into audio data. The audio data can be output to the processor 680 for processing and then use the RF circuit 610 to transmit to, e.g., another terminal. Alternatively, the audio data can be output to the memory 620 for further processing. The audio circuit 660 may also include an earplug jack to provide communications between the peripheral headset and the terminal device 600.

The WiFi may belong to a short distance wireless transmission technology. The terminal device 600 may use the WiFi module 670 to help users send and receive emails, browse websites, access streaming media, etc. The WiFi module 670 can provide users with a wireless broadband Internet access. Although the WiFi module 670 is shown in FIG. 6, it can be understood that the WiFi may not be a necessary component of the terminal device 600 and may be omitted without changing the essential scope of the present disclosure.

The processor 680 can be a control center of the terminal device 600: using a variety of interfaces and circuits to connect various parts, e.g., throughout a mobile phone; running or executing software programs and/or modules stored in the memory 620; calling the stored data in the memory 620; and/or performing various functions and data processing of the terminal device 600 to monitor the overall mobile phone. The processor 680 may include one or more processing cores. In an exemplary embodiment, the processor 680 may integrate an application processor with a modulation and demodulation processor. The application processor is mainly used to process an operating system, user interface, and applications. The modulation and demodulation processor is mainly used to deal with wireless communications. In various embodiments, the modulation and demodulation processor may or may not be integrated into the processor 680.

The terminal device 600 may further include a power supply 690 (such as a battery) to power various components of the terminal. In an exemplary embodiment, the power supply can be connected to the processor 680 via the power management system, and thus use the power management system to manage charging, discharging, and/or power management functions. The power supply 690 may also include one or more DC or AC power supplies, a recharging system, a power failure detection circuit, a power converter or inverter, a power status indicator and/or any other suitable components.

Although not shown in FIG. 6, the terminal device 600 can further include a camera, a Bluetooth module, etc. without limitation. Specifically, the terminal device 600 can have a display unit of a touch screen display, a memory, and one or more programs stored in the memory. The terminal can be configured to use one or more processors to execute the one or more programs stored in the memory to execute the above operations of the server interface 401, client interface 402, first establishment unit 403, reception unit 404, transmission unit 405, second establishment unit 406, disconnection unit 407, determination unit 408, register unit 409, monitor unit 410 and processing unit 411.

It should be noted that each embodiment in the present disclosure may be described in a progressive mode. The focus of each embodiment may be different. Refer to each embodiment for the same or similar parts. For the device embodiment, since the device embodiment is similar as the method embodiment, the device embodiment may be simply described. The relevant parts of the device embodiment may be referred to the method embodiments.

It should be noted that in the present disclosure, relational terms, such as the "first" and "second" are used for distinguishing an entity or operation from another entity or operation, but not used for demanding or implying that there is any order relationship between these entities or operations. Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It may be well known by an ordinary skilled in the art of the preset disclosure that partial or all blocks of the above embodiments may be implemented via hardware and may be implemented by hardware instructed by a program. The program may be stored in a machine readable storage media. The storage media may be a Read-only Memory (ROM), a disk or a Compact Disk (CD), etc.

What has been described and illustrated herein are embodiments of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for exchanging data between processes, the method cornprising:
   establishing a connection between a server process and a port via a server interface, which is provided by the port by encapsulating the port; receiving, by the port, a data process request carrying a name of the server process from a client process via a client interface, which is provided by the port by encapsulating the port;
   sending, by the port, the data process request to the server process via the server interface;
   establishing, by the port, a connection between the client process and the server process according to the name of the server process;
   forwarding, by the port, data sent from the client process to the server process via the server interface;
   forwarding, by the port, data processed by the server process to the client process via the client interface;
   disconnecting the connection between the client process and the server process; and
   re-establishing the connection between the client process and the server process when the a second data process request is received;
   wherein the server interface and the client interface are generated by encapsulating the port using a network engine.

2. The method according to claim 1, wherein
   if in an iPhone Operating System (iOS), the port comprises a Core Foundation (CF) MessagePort, a socket or a pipe; or
   if in an android system, the port comprises a socket, a pipe, or a binder.

3. The method according to claim 2, wherein receiving the data process request from the client process via the client interface comprises:
   receiving the data process request from the client process via the client interface when the client process determines that the server process has run via the client interface.

4. The method according to claim 2, wherein the data process request comprises: a synchronous data process request or an asynchronous data process request.

5. The method according to claim 4, further comprising:
   monitoring a register message sent from the client process via the server interface; and
   forwarding the data processed by the server process to the client process via the client interface if the register message has been registered.

6. A device for exchanging data between processes, the device comprising a memory and a processor, wherein the memory comprises one or more programs that when executed by the processor cause the processor to:
   establish a connection between a server process and a port via a server interface, which is provided by the port by encapsulating the port; receive, by the port, a data process request carrying a name of the server process from a client process via the client interface, which is provided by the port by encapsulating the port;
   send, by the port, the data process request to the server process via the server interface ;
   establish, by the port, a connection between the client process and the server process according to the name of the server process; forward, by the port, data sent from the client process to the server process via the server interface; and
   forward, by the port, data processed by the server process to the client process via the client interface;
   disconnecting the connection between the client process and the server process; and
   re-establishing the connection between the client process and the server process when the a second data process request is received;
   wherein the server interface and the client interface are generated by encapsulating the port using a network engine.

7. The device according to claim 6, wherein
   if in an iPhone Operating System (iOS), the port comprises a Core Foundation (CF)MessagePort, a socket or a pipe; or
   if in an android system, the port comprises a socket, a pipe or a binder.

8. The device according to claim 7, wherein the one or more programs when executed by the processor further cause the processor to receive the data process request from the client process via the client interface when the client process determines that the server process has run via the client interface.

9. The device according to claim 7, wherein the data process request comprises: a synchronous data process request or an asynchronous data process request.

10. The device according to claim 6, wherein the one or more programs when executed by the processor further cause the processor to:

monitor a register message sent from the client process using the server interface; and forward the data processed by the server process to the client process via the client interface if the register message has been registered.

\* \* \* \* \*